United States Patent
Nall, III

(10) Patent No.: US 6,450,516 B1
(45) Date of Patent: Sep. 17, 2002

(54) SCOOTER WITH ADJUSTABLE SEAT ASSEMBLY

(76) Inventor: Claude E. Nall, III, 13943 Hartman La., #3, Walker, LA (US) 70785

( * ) Notice: Subject to any disclaimer, the term of this patent is extended or adjusted under 35 U.S.C. 154(b) by 0 days.

(21) Appl. No.: 09/797,156

(22) Filed: Mar. 1, 2001

(51) Int. Cl.$^7$ ............................................. B62M 1/00
(52) U.S. Cl. ............................. 280/87.021; 280/288.1
(58) Field of Search ...................... 280/87.021, 87.041, 280/278, 287, 288.1, 281.1, 282, 288

(56) References Cited

U.S. PATENT DOCUMENTS

| | | | | |
|---|---|---|---|---|
| 1,535,167 A | * | 4/1925 | Lovell | 280/87.021 |
| 2,660,442 A | * | 11/1953 | Wiesner et al. | 280/287 X |
| 2,926,927 A | * | 3/1960 | Enright | 280/87.021 |
| 4,441,729 A | * | 4/1984 | Underwood | 280/278 |
| D300,756 S | * | 4/1989 | Cummings | 280/87.021 |
| 5,470,089 A | * | 11/1995 | Whitson et al. | 280/87.041 |

FOREIGN PATENT DOCUMENTS

GB  1088789  * 10/1967  ................. 280/278

* cited by examiner

*Primary Examiner*—Michael Mar
(74) *Attorney, Agent, or Firm*—Joseph N. Breaux

(57) ABSTRACT

A steerable scooter including a standing platform supported on a rollable rear support wheel, a steerable front support wheel, and adjustable seat assembly. The scooter includes a support platform positioned below the top surface of the support wheels. In addition, the scooter includes an adjustable seat that has a top surface positionable two or more inches below the top surface of the support wheels.

1 Claim, 2 Drawing Sheets

US 6,450,516 B1

SCOOTER WITH ADJUSTABLE SEAT ASSEMBLY

TECHNICAL FIELD

The present invention relates to scooters having a standing platform supported by a scooter frame having rollable wheels and a steering assembly in connection with one of the rollable wheels and having a handle assembly moveable by a scooter driver for orienting the connected rollable wheel in a manner to select the direction of travel of the scooter and more particularly to a scooter with an adjustable seat assembly that includes a scooter frame assembly, a front support wheel, a rear support wheel, a steering assembly, a user standing platform, and an adjustable height seat assembly; the scooter frame assembly including a stand support portion having a forward support portion end rigidly connected to a head tube attachment structure and a rear support portion end rigidly connected to a rear wheel attachment frame portion; the rear wheel attachment frame portion including a pair of spaced-apart, V-shaped wheel support stay members each having a rear wheel connection structure at an apex portion thereof and two stay members extending from the apex portion and terminating in rigid connection with a seat tube portion of the scooter frame assembly that extends outwardly from the stand support portion; the user standing platform being secured to the stand support portion and having a substantially planar user stand area; the steering assembly including a handle bar member, a front wheel fork, a head tube, and a steering rod; the head tube being rigidly connected to the head tube attachment structure of the scooter frame assembly at a rake angle "R" with respect to a line oriented perpendicularly to the substantially planar user stand area of the user standing platform of between zero and thirty degrees; the steering rod having a center rod portion rotatably entrapped within the head tube, a top rod portion in adjustable connection with the handle bar member and a bottom rod portion rigidly connected to a top fork portion of the front wheel fork; the front wheel fork having a pair of spaced fork members each provided with a front wheel connecting structure; the front wheel connecting structures and the rear wheel connection structures being positioned with respect to each other such that, when the rear support wheel is rotatably attached to the rear wheel attachment frame portion and the front support wheel is rotatably attached to the front wheel fork of the steering assembly, the stand support portion of the scooter frame assembly is supported above a line drawn between a bottom rear support wheel surface and a bottom front support wheel surface a distance "A" greater than two inches; the adjustable height seat assembly including a seat post, a seat member and a seat post locking clamp; the seat post having a first post end portion positioned within the seat tube portion of the scooter frame assembly and a second post end portion supporting the seat member; the seat member having a top user support seat surface; the seat post locking clamp being in connection with a top end of the seat tube portion of the scooter frame assembly in a manner to allow a user to secure the first post end portion in a variety of positions with respect to the seat tube portion of the scooter frame assembly and in a manner such that the top user support seat surface of the seat member is positionable between a lowermost seat position wherein the top user support seat surface of the seat member is positioned below a line drawn between a top rear support wheel surface and a top front support wheel surface a distance "$B_1$" of at least two inches and an uppermost seat position wherein the top user support seat surface of the seat member is positioned above a line drawn between a top rear support wheel surface and a top front support wheel surface a distance "$B_2$" of at least three inches; the user standing platform having a standing surface positioned a minimum distance "C" of three inches below a line drawn between the rear wheel connection structure and the front wheel connecting structure.

BACKGROUND ART

Steerable scooters typically include a standing platform supported on a rollable rear support wheel and a steerable front support wheels. In many such scooters, the support wheels are simply skate wheels that have been attached to the standing platform. These types of scooters can be dangerous because even small rocks can prevent the support wheels from rolling, causing the scooter to come to an abrupt halt and, oftentimes, throwing the scooter rider from the scooter onto the ground. In addition, the small wheels make steering difficult and the scooter unstable because the center of gravity of the combination of the scooter and the rider is well above the top surfaces of the support wheels. It would be a benefit, therefore, to have a scooter that included large support wheels and a support platform positioned below the top surface of the support wheels. In addition, because scooters can be used to travel long distances, it would be a further benefit to have a scooter that included a seat that could be used by the rider if desired. To enhance the stability of the scooter, it would be a further benefit to have a scooter that included a seat having a top surface positioned two or more inches below the top surface of the support wheels.

GENERAL SUMMARY DISCUSSION OF INVENTION

It is thus an object of the invention to provide a scooter with an adjustable seat assembly that includes a scooter frame assembly, a front support wheel, a rear support wheel, a steering assembly, a user standing platform, and an adjustable height seat assembly; the scooter frame assembly including a stand support portion having a forward support portion end rigidly connected to a head tube attachment structure and a rear support portion end rigidly connected to a rear wheel attachment frame portion; the rear wheel attachment frame portion including a pair of spaced-apart, V-shaped wheel support stay members each having a rear wheel connection structure at an apex portion thereof and two stay members extending from the apex portion and terminating in rigid connection with a seat tube portion of the scooter frame assembly that extends outwardly from the stand support portion; the user standing platform being secured to the stand support portion and having a substantially planar user stand area; the steering assembly including a handle bar member, a front wheel fork, a head tube, and a steering rod; the head tube being rigidly connected to the head tube attachment structure of the scooter frame assembly at a rake angle "R" with respect to a line oriented perpendicularly to the substantially planar user stand area of the user standing platform of between zero and thirty degrees; the steering rod having a center rod portion rotatably entrapped within the head tube, a top rod portion in adjustable connection with the handle bar member and a bottom rod portion rigidly connected to a top fork portion of the front wheel fork; the front wheel fork having a pair of spaced fork members each provided with a front wheel connecting structure; the front wheel connecting structures and the rear wheel connection structures being positioned with respect to each other such that, when the rear support wheel is rotatably attached to the rear wheel attachment frame portion and the front support wheel is rotatably attached to the front wheel fork of the steering assembly, the stand support portion of the scooter frame assembly is supported above a line drawn between a bottom rear support wheel surface and a bottom front support wheel surface a distance "A" greater than two inches; the adjustable height seat assembly including a seat post, a seat member and a seat post locking clamp; the seat post having a first post end portion positioned within the seat tube portion of the scooter frame assembly and a second post end portion supporting the seat member; the seat member having a top user support seat surface; the seat post locking clamp being in connection with a top end of the seat tube portion of the scooter frame assembly in a manner to allow a user to secure the first post end portion in a variety of positions with respect to the seat tube portion of the scooter frame assembly and in a manner such that the top user support seat surface of the seat member is positionable between a lowermost seat position wherein the top user support seat surface of the seat member is positioned below a line drawn between a top rear support wheel surface and a top front support wheel surface a distance "$B_1$" of at least two inches and an uppermost seat position wherein the top user support seat surface of the seat member is positioned above a line drawn between a top rear support wheel surface and a top front support wheel surface a distance "$B_2$" of at least three inches; the user standing platform having a standing surface positioned a minimum distance "C" of three inches below a line drawn between the rear wheel connection structure and the front wheel connecting structure. As used herein the phrase "substantially planar" encompasses substantially flat surfaces having a number of mounds or other projections extending therefrom for providing an anti-slip standing surface area.

Accordingly, a scooter with an adjustable seat assembly is provided. The scooter with an adjustable seat assembly includes a scooter frame assembly, a front support wheel, a rear support wheel, a steering assembly, a user standing platform, and an adjustable height seat assembly; the scooter frame assembly including a stand support portion having a forward support portion end rigidly connected to a head tube attachment structure and a rear support portion end rigidly connected to a rear wheel attachment frame portion; the rear wheel attachment frame portion including a pair of spaced-apart, V-shaped wheel support stay members each having a rear wheel connection structure at an apex portion thereof and two stay members extending from the apex portion and terminating in rigid connection with a seat tube portion of the scooter frame assembly that extends outwardly from the stand support portion; the user standing platform being secured to the stand support portion and having a substantially planar user stand area; the steering assembly including a handle bar member, a front wheel fork, a head tube, and a steering rod; the head tube being rigidly connected to the head tube attachment structure of the scooter frame assembly at a rake angle "R" with respect to a line oriented perpendicularly to the substantially planar user stand area of the user standing platform of between zero and thirty degrees; the steering rod having a center rod portion rotatably entrapped within the head tube, a top rod portion in adjustable connection with the handle bar member and a bottom rod portion rigidly connected to a top fork portion of the front wheel fork; the front wheel fork having a pair of spaced fork members each provided with a front wheel connecting structure; the front wheel connecting structures and the rear wheel connection structures being positioned with respect to each other such that, when the rear support wheel is rotatably attached to the rear wheel attachment frame portion and the front support wheel is rotatably attached to the front wheel fork of the steering assembly, the stand support portion of the scooter frame assembly is supported above a line drawn between a bottom rear support wheel surface and a bottom front support wheel surface a distance "A" greater than two inches; the adjustable height seat assembly including a seat post, a seat member and a seat post locking clamp; the seat post having a first post end portion positioned within the seat tube portion of the scooter frame assembly and a second post end portion supporting the seat member; the seat member having a top user support seat surface; the seat post locking clamp being in connection with a top end of the seat tube portion of the scooter frame assembly in a manner to allow a user to secure the first post end portion in a variety of positions with respect to the seat tube portion of the scooter frame assembly and in a manner such that the top user support seat surface of the seat member is positionable between a lowermost seat position wherein the top user support seat surface of the seat member is positioned below a line drawn between a top rear support wheel surface and a top front support wheel surface a distance "$B_1$" of at least two inches and an uppermost seat position wherein the top user support seat surface of the seat member is positioned above a line drawn between a top rear support wheel surface and a top front support wheel surface a distance "$B_2$" of at least three inches; the user standing platform having a standing surface positioned a minimum distance "C" of three inches below a line drawn between the rear wheel connection structure and the front wheel connecting structure. The rake angle "R" is preferable between 5 and 25 degrees and more preferable between 10 and 20 degrees.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
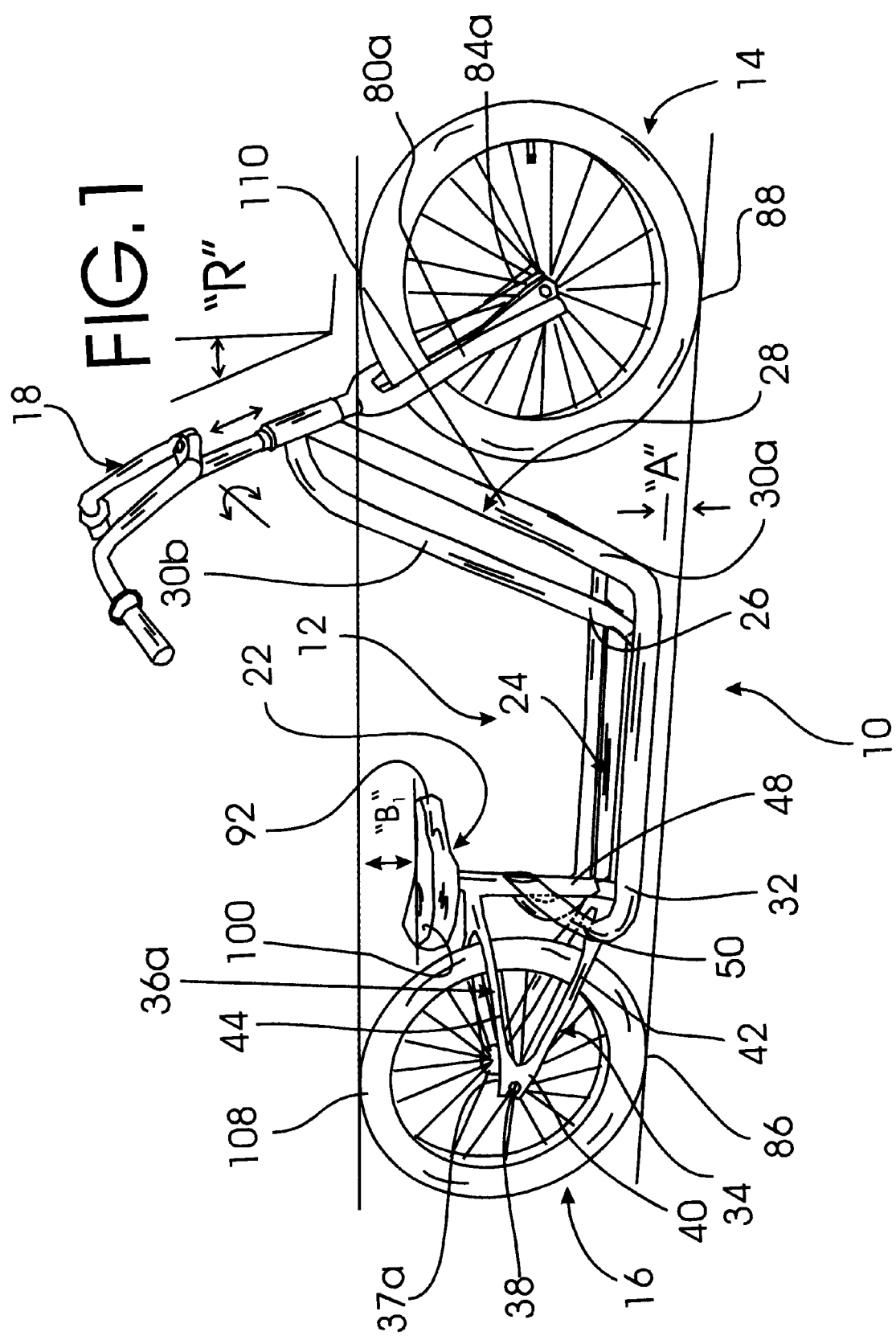
FIG. 1 is a perspective view of an exemplary embodiment of the scooter with adjustable seat assembly of the present invention with the user standing platform removed to show the stand support portion of the scooter frame assembly and the seat of the adjustable seat assembly positioned at its lowest most position with the top seat surface positioned below the top of the front and rear pneumatic support wheels.
Figure 2:
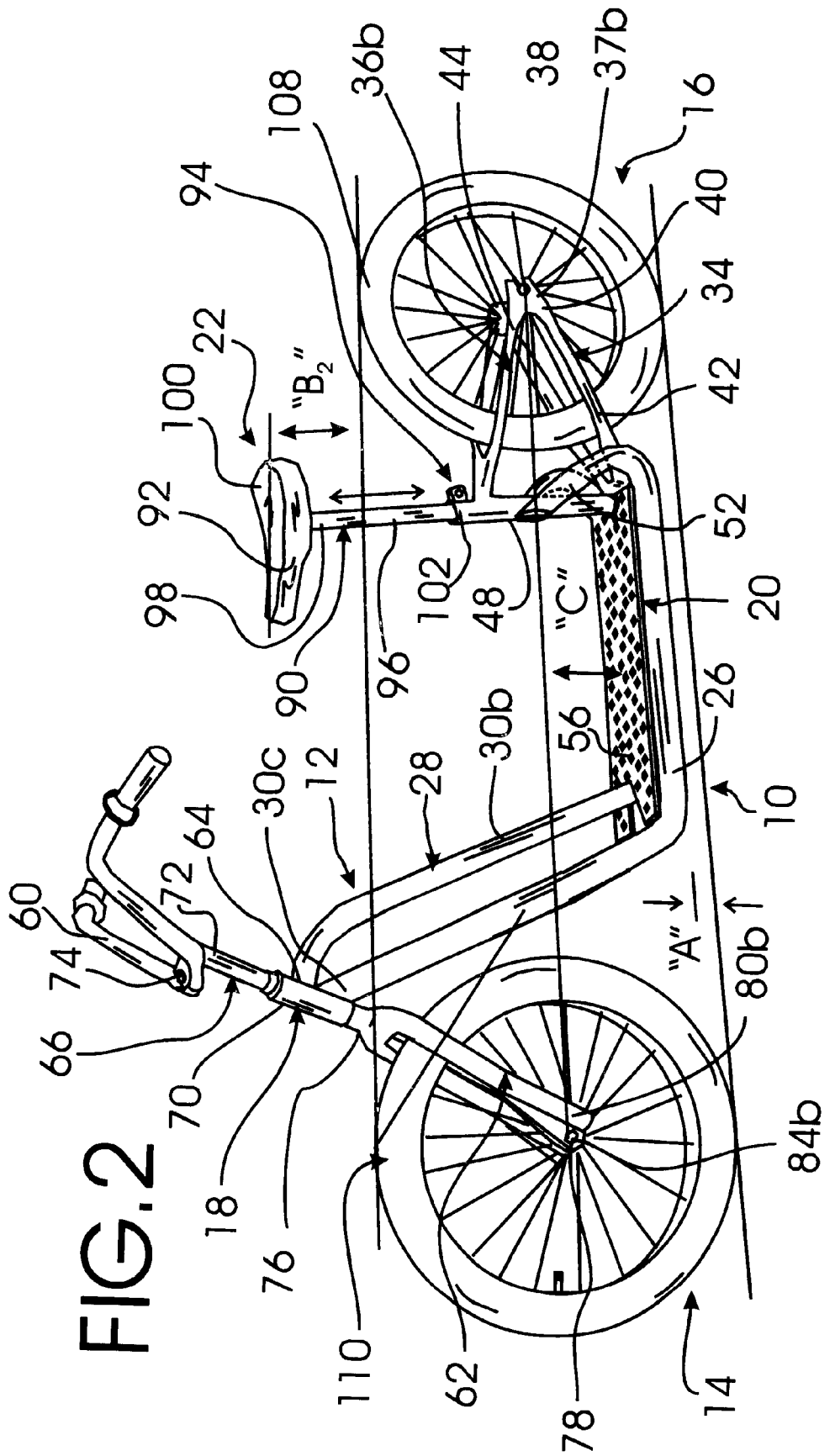
FIG. 2 is a second perspective view of the exemplary scooter with adjustable seat assembly of FIG. 1 with the user standing platform attached to the stand support portion of the scooter frame assembly and the seat of the adjustable seat assembly positioned at its highest position with the top seat surface positioned above the top of the front and rear pneumatic support wheels.

FIGS. 1 and 2 show various aspects of an exemplary embodiment of the scooter with adjustable seat assembly of the present invention generally designated 10. Scooter with adjustable seat assembly 10 includes a scooter frame assembly, generally designated 12; a front pneumatic, support wheel, generally designated 14; a rear pneumatic, support wheel, generally designated 16; a steering assembly, generally designated 18, a user standing platform, generally designated 20; and an adjustable height seat assembly, generally designated 22.

Scooter frame assembly 12 is of metal construction and includes a stand support portion, generally designated 24, having a forward support portion end 26 rigidly connected to a head tube attachment structure, generally designated 28, constructed of three head tube attachment pipes 30*a–c,* and a rear support portion end 32 rigidly connected to a rear wheel attachment frame portion, generally designated 34.

Rear wheel attachment frame portion 34 includes two, spaced-apart, V-shaped wheel support stay members, generally designated 36*a,* 36*b,* each having a rear wheel connection structure 37*a,* 37*b* in the form of a wheel axle receiving notch 38 at an apex portion 40 thereof and two stay members 42, 44 extending from apex portion 40 and terminating in rigid connection with a seat tube portion 48 of scooter frame assembly 12. Seat tube portion 48 extends outwardly from stand support portion 24 and is braced by curved supports 50, 52. User standing platform 20 is a section of steel sheeting secured to stand support portion 24 by welding and has a raised diamond pattern on a substantially planar user stand area 56 that is provided for a user to stand on while riding scooter 10 if desired.

Steering assembly 18 includes a handle bar member 60; a front wheel fork, generally designated 62; a head tube, generally designated 64; and a steering rod, generally designated 66. Head tube 64 is rigidly connected to the three head tube attachment pipes 30*a–c* at a rake angle "R", with respect to a line oriented perpendicularly to the substantially planar user stand area 56 of user standing platform 20, of fifteen degrees. Steering rod 66 has a center rod portion 70 (shown in dashed lines in FIG. 2) rotatably entrapped within head tube 64, a top rod portion 72 in adjustable connection with handle bar member 60 by a handle bar clamping bracket 74 provided thereon, and a bottom rod portion 76 rigidly connected to a top fork portion 78 of front wheel fork 62. Front wheel fork 62 has a pair of spaced fork members 80*a,* 80*b* that are each provided with a front wheel connecting structure in the form of a front axle receiving aperture 84*a,* 84*b.*

Stand support portion 24 of scooter frame assembly 12 is supported above a line drawn between a bottom rear support wheel surface 86 and a bottom front support wheel surface 88 a distance "A" of three and one-half inches. Adjustable height seat assembly 22 includes a seat post, generally designated 90; a seat member, generally designated 92; and a seat post locking clamp, generally designated 94. Seat post 90 has a first post end portion 96 positioned within seat tube portion 48 of scooter frame assembly 12 and a second post end portion 98 supporting seat member 92. Seat member 92 has a top user support seat surface 100 for supporting the buttocks of a user if desired. Seat post locking clamp 94 is in connection with a top end 102 of seat tube portion 48 in a manner to allow a user to clamp first post end portion 96 in a variety of positions with respect to the seat tube portion 48. Top user support seat surface 100 of seat member 92 is positionable between a lowermost seat position (shown in FIG. 1) wherein top user support seat surface 100 is positioned below a line drawn between a top rear support wheel surface 108 and a top front support wheel surface 110 a distance "B$_1$" of three inches and an uppermost seat position (shown in FIG. 2) wherein top user support seat surface 100 is positioned above a line drawn between top rear support wheel surface 108 and top front support wheel surface 110 a distance "B$_2$" of five inches.

In this embodiment, user stand area 56 is positioned a distance "C" of five inches below a line drawn between the rear wheel connection structures 37*a,* 37*b* and the front wheel connecting structures 84*a,* 84*b.*

In use, scooter 10 is used by standing on user stand area 56 or sitting on top user support seat surface 100.

It can be seen from the preceding description that a scooter with an adjustable seat assembly has been provided.

It is noted that the embodiment of the scooter with an adjustable seat assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A scooter with an adjustable seat assembly comprising:
   a scooter frame assembly;
   a front support wheel;
   a rear support wheel;
   a steering assembly;
   a user standing platform; and
   an adjustable height seat assembly;
   the scooter frame assembly including a stand support portion formed by a pair of laterally spaced, longitudinally extending tube members and having a forward support portion end rigidly connected to a head tube attachment structure and a rear support portion end rigidly connected to a rear wheel attachment frame portion the rear support portion end being formed by curved rearward portions of the tube members which extends upwardly, forwardly, and laterally to terminate at a point of intersection, the rear support portion end at the point of intersection being connected to a forward surface of a seat tube portion of the scooter frame assembly that extends upwardly from the stand support portion;
   the rear wheel attachment frame portion including a pair of spaced-apart, V-shaped wheel support stay members each having a rear wheel connection structure at an apex portion thereof and two stay members extending from the apex portion and terminating in rigid connection with the seat tube portion;
   the user standing platform being secured to the stand support portion and having a substantially planar user stand area;
   the steering assembly including a handle bar member, a front wheel fork, a head tube, and a steering rod;
   the head tube being rigidly connected to the head tube attachment structure of the scooter frame assembly at a rake angle with respect to a line oriented perpendicularly to the substantially planar user stand area of the user standing platform of between zero and thirty degrees;
   the steering rod having a center rod portion rotatably entrapped within the head tube, a top rod portion in adjustable connection with the handle bar member and a bottom rod portion rigidly connected to a top fork portion of the front wheel fork;
   the front wheel fork having a pair of spaced fork members each provided with a front wheel connecting structure;
   the front wheel connecting structures and the rear wheel connection structures being positioned with respect to each other such that, when the rear support wheel is rotatably attached to the rear wheel attachment frame portion and the front support wheel is rotatably attached to the front wheel fork of the steering assembly, the stand support portion of the scooter frame assembly is supported above a line drawn between a bottom rear support wheel surface and a bottom front support wheel surface a distance greater than two inches;

the adjustable height seat assembly including a seat post, a seat member and a seat post locking clamp;

the seat post having a first post end portion positioned within the seat tube portion of the scooter frame assembly and a second post end portion supporting the seat member;

the seat member having a top user support seat surface;

the seat post locking clamp being in connection with a top end of the seat tube portion of the scooter frame assembly in a manner to allow a user to secure the first post end portion in a variety of positions with respect to the seat tube portion of the scooter frame assembly and in a manner such that the top user support seat surface of the seat member is positionable between a lowermost seat position wherein the top user support seat surface of the seat member is positioned below a line drawn between a top rear support wheel surface and a top front support wheel surface a distance of at least two inches and an uppermost seat position wherein the top user support seat surface of the seat member is positioned above a line drawn between a top rear support wheel surface and a top front support wheel surface a distance of at least three inches;

the user standing platform having a standing surface positioned a minimum distance of three inches below a line drawn between the rear wheel connection structure and the front wheel connecting structure.

* * * * *